March 4, 1958  H. E. HOOE  2,825,503
COMBINATION TABULATING AND CARD PUNCHING MACHINE
Filed May 3, 1954  6 Sheets-Sheet 1

INVENTOR.
HUNTER E. HOOE
BY
Mellin and Hanscom
ATTORNEYS

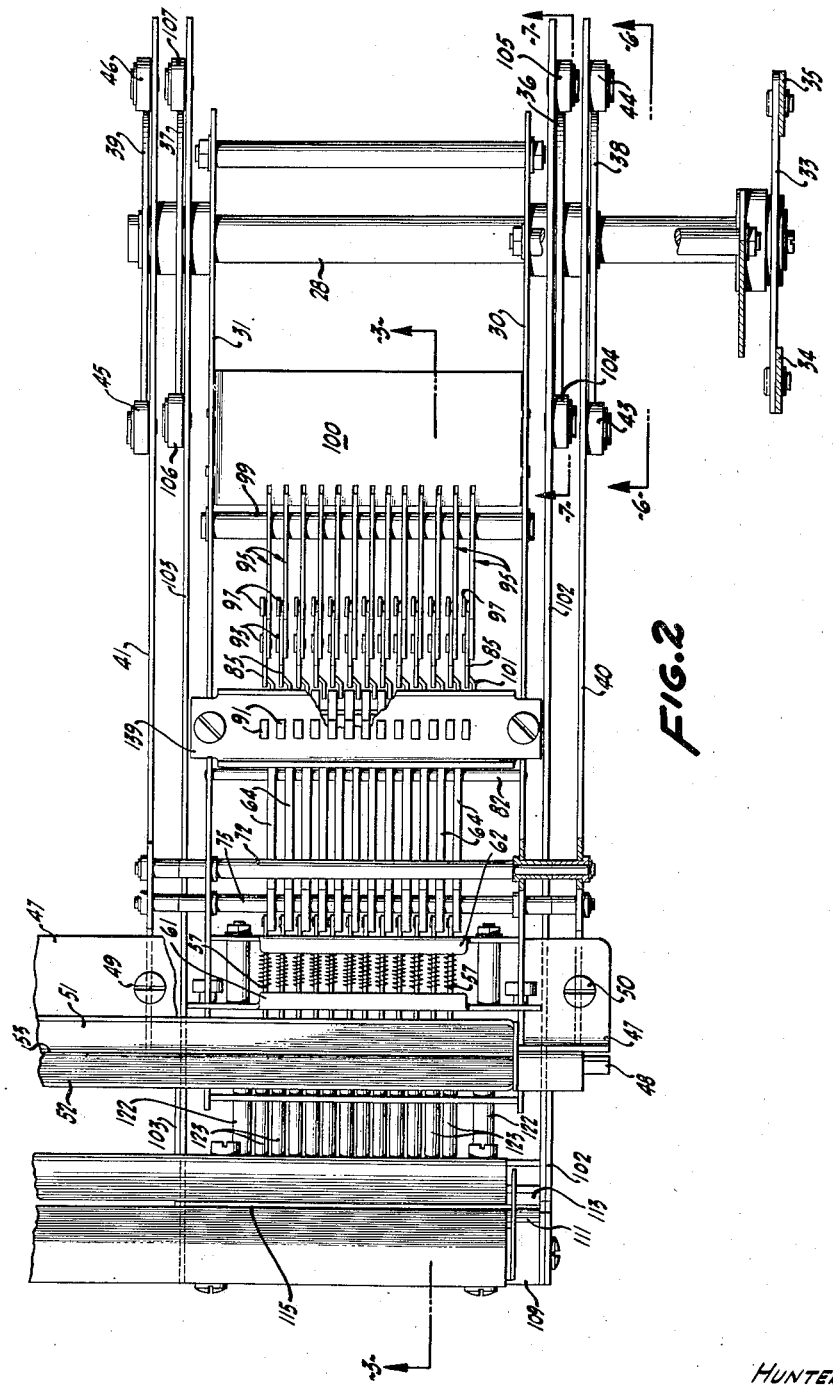

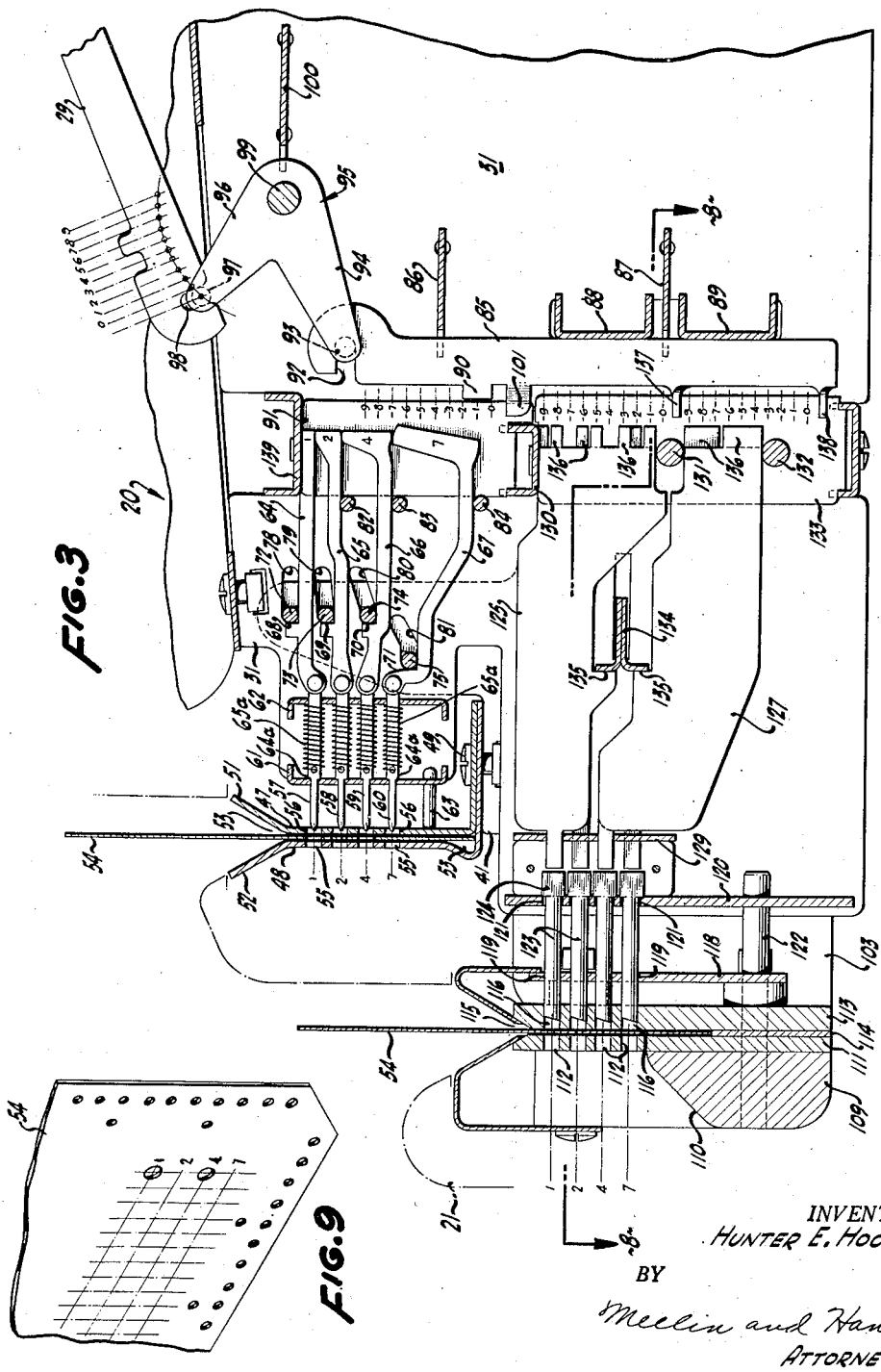

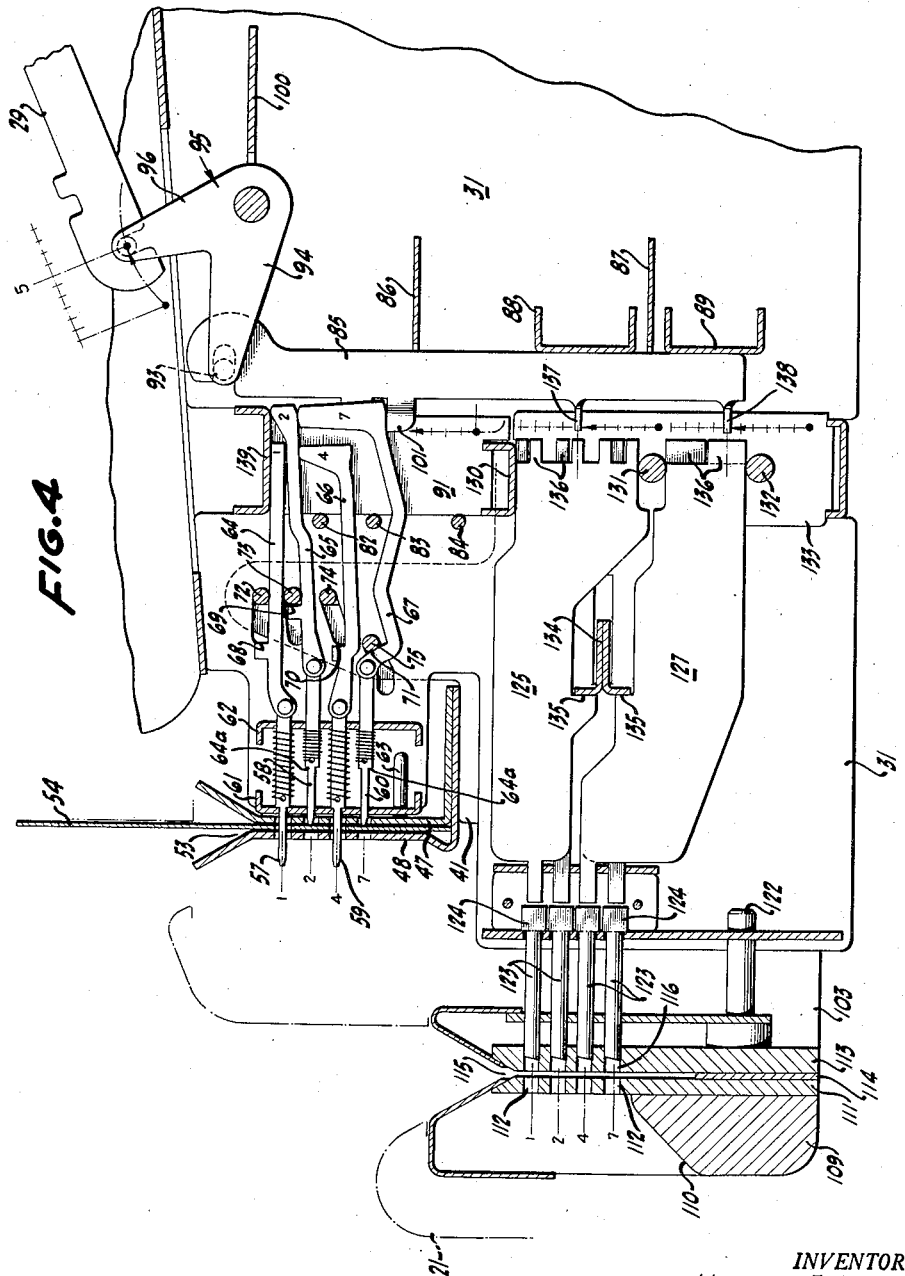

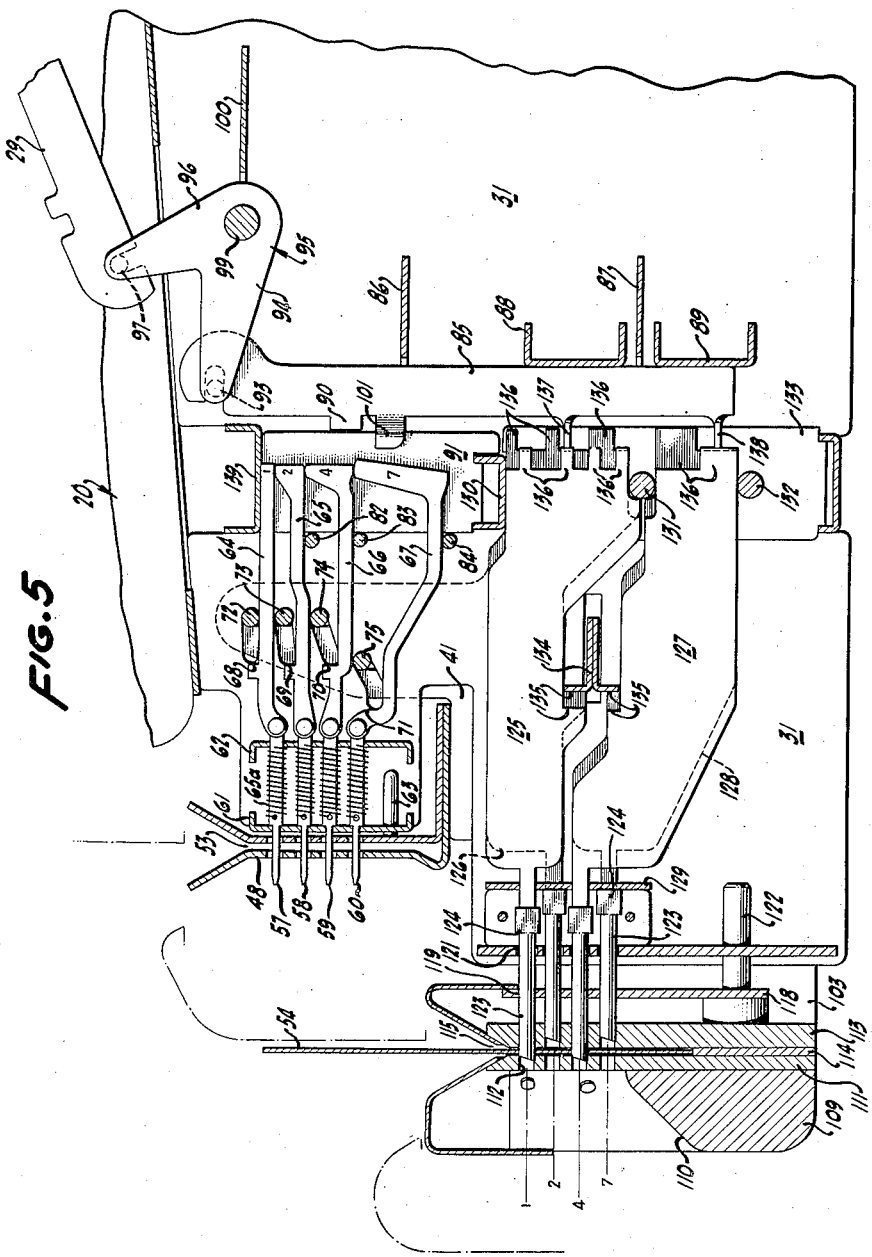

March 4, 1958 H. E. HOOE 2,825,503
COMBINATION TABULATING AND CARD PUNCHING MACHINE
Filed May 3, 1954 6 Sheets-Sheet 6
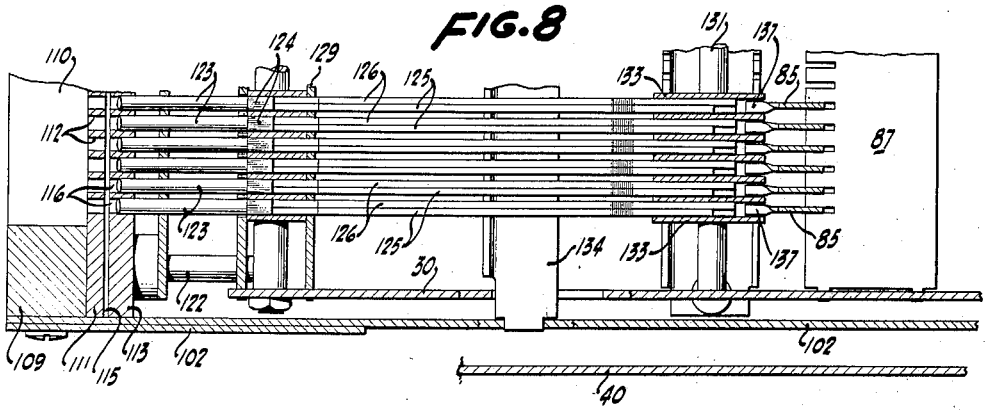
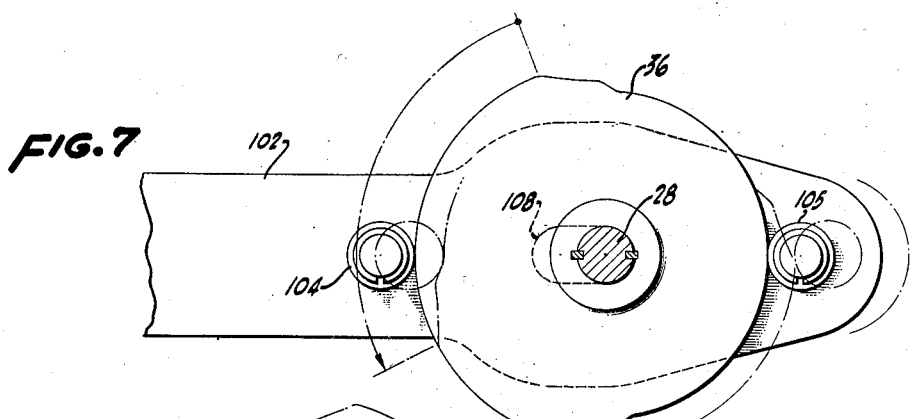
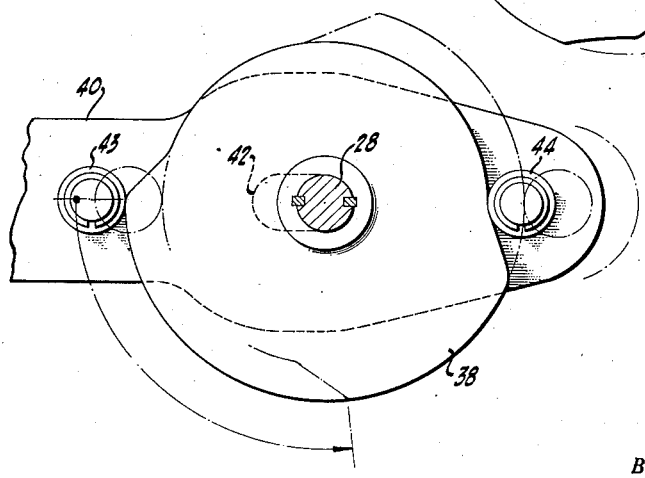
INVENTOR.
HUNTER E. HOOE
BY
Mellin and Hanscom
ATTORNEYS 0
United States Patent Office 2,825,503
Patented Mar. 4, 1958

2,825,503

COMBINATION TABULATING AND CARD PUNCHING MACHINE

Hunter E. Hooe, Athens, Ohio, assignor, by mesne assignments, to Royal McBee Corporation, a corporation of New York Application May 3, 1954, Serial No. 427,001

8 Claims. (Cl. 235—61.1)

This invention relates to the art of record card punching and tabulating and more particularly to a machine for punching and tabulating record cards or sheets.

In prior practice, it was common to prepare record cards by punching the coded designation thereon with one machine and to tabulate the coded cards by means of a separate machine.

It is the principal object of this invention to provide a machine in which cards may be punched with a coded numerical designation and the coded values thereof simultaneously tabulated, and in which machine precoded cards may be inserted and the codings thereof sensed and tabulated.

Another object of this invention is to provide an efficient machine wherein a numerical value may be punched into each of a series of cards, which numerical values will be accumulated by the machine and the total of such accumulation coded into a single card by punch coding of the same.

Another object of the invention is to provide a machine of the character referred to in which cards or sheets, each having a numerical value coded therein by punching, may be inserted, which machine is operative to read such coding as the cards are inserted and to accumulate the numerical values thereof and indicate the total thereof, which total may be punched into a single card by code punching the same.

Another object of the present invention is to provide an efficient and relatively simple machine of the character referred to, which is capable of reading the numerical values punch coded into record cards or sheets and simultaneously reproducing such code punching into a duplicate card or sheet while tabulating the coding of such cards and accumulating the said numerical values thereof.

A further object of this invention is to provide a machine for performing the operations set forth in the previous objects wherein a visual printed record showing the numerical value punched on each individual card is produced simultaneously with the coding or reading of the cards, the machine also enabling the total of said numerical values to be printed on said record.

One form which the invention may assume is exemplified in the following description and illustrated by way of example in the accompanying drawings, in which:

Fig. 2 is a sectional view taken on line 2—2 of Fig. 1.

Fig. 3 is a sectional view taken on line 3—3 of Fig. 2 and showing the operating mechanism for one denominational order, all of the parts being shown in the position they would occupy at the start of a cycle of the machine.

Fig. 4 is a similar view to that shown in Fig. 3, but showing the parts after the first portion of a tabulating cycle has been completed.

Fig. 5 is a similar view to Figs. 3 and 4, but showing the parts in the position they would occupy at the first half of a card punching cycle.

Fig. 6 is a sectional view taken on line 6—6 of Fig. 2.

Fig. 7 is a sectional view taken on line 7—7 of Fig. 2.

Fig. 8 is a sectional view taken on line 8—8 of Fig. 3.

Fig. 9 is a perspective view of a card having been punched by the machine.

Figure 1:
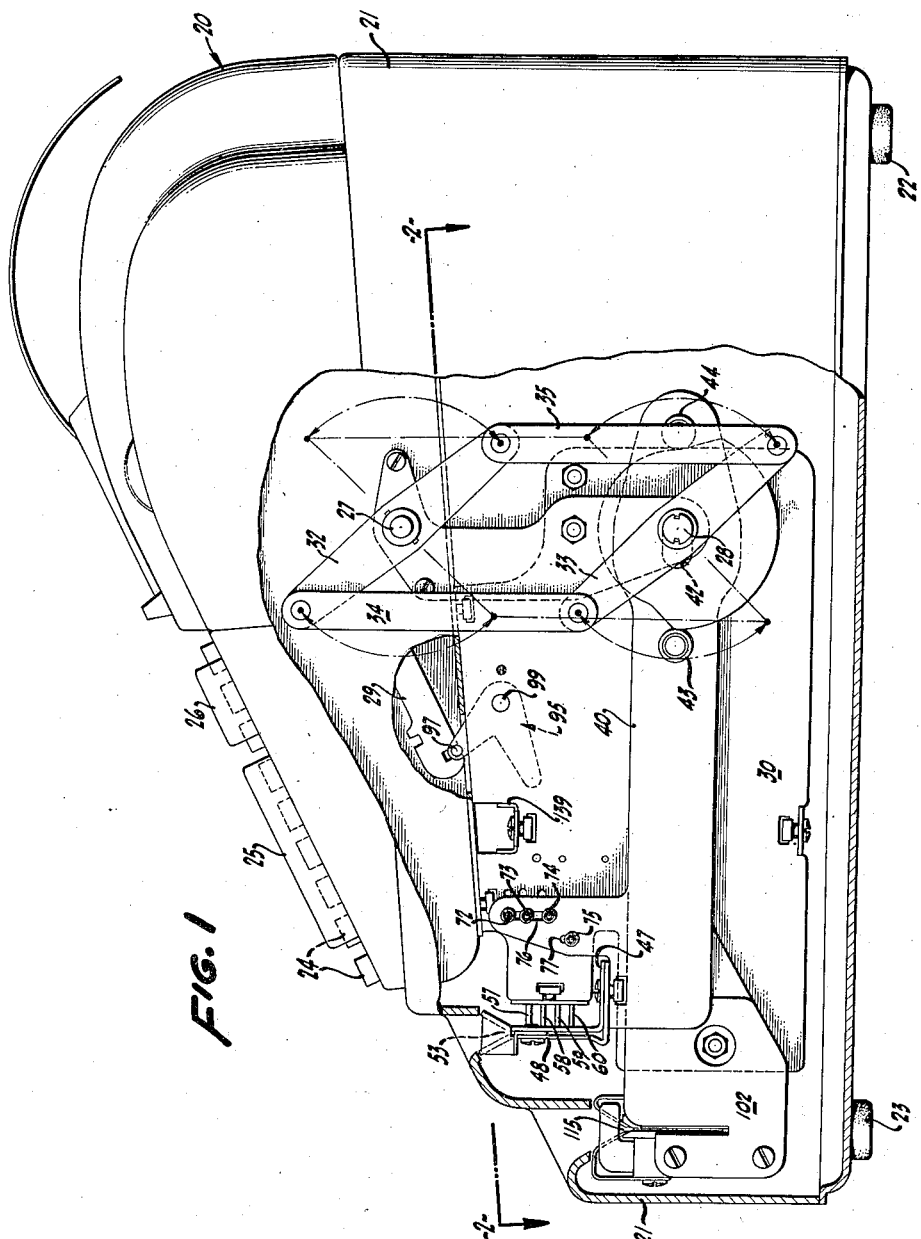
Fig. 1 is a side elevation of a machine embodying the principles of my invention, and having certain portions of the housing broken away to reveal details of elements located therebehind.

Referring now to the drawings and particularly Fig. 1 thereof, there is disclosed a machine 20 for accomplishing the above objects, which machine is enclosed by a housing 21. The machine is of dimensions and weight that it is portable in nature and for use may be placed on top of a desk or table on four rubber pads 22 and 23 located one at each corner at the bottom of said machine.

The operating parts of the machine may be said to be in three integrated groups. These groups are a conventional adding mechanism mounted in the upper portion of the housing 21 above the section line 2—2 of Fig. 1, a card sensing or reading mechanism for sensing or reading the coded designation on a record card, said sensing mechanism being located centrally in the housing 21 immediately below the section line 2—2 of Fig. 1, and a card punching mechanism located in the lowermost portion of the housing 21 below the sensing mechanism.

*Adding and totalizing mechanism*

The particular details of the adding mechanism of the instant machine are of a conventional nature and per se form no part of the instant invention. The adding mechanism illustrated is of the full keyboard type having keys 24 for conditioning the individual columns of the machine, an add bar 25 and a subtract bar 26 for initiating the operation of the usual drive motor (not shown) which drives the mechanism through its cycle. The adding mechanism includes a main drive shaft 27 which oscillates to actuate the adding mechanism. This shaft 27 (through a linkage to be described presently) operates a secondary drive shaft 28 of the card sensing and punching mechanism. The adding mechanism is provided with the usual tape operating and printing mechanism (not shown in the drawings).

It is to be understood that the invention is not limited to the use of an adding mechanism of the full keyboard type or of the type which employs an oscillating drive shaft. The invention may equally employ adding mechanisms of the ten-key type employing a full rotation drive shaft. The requirement of the adding mechanism is that it be equipped with racks, such as shown at 29, one for each denominational order of the mechanism, and one for a carry-over column. In a ten-column mechanism, such as disclosed herein, there would be eleven of these racks.

The use of racks, such as shown at 29, is conventional on almost all types of adding mechanisms. On each cycle of the adding mechanism, the racks 29 reciprocate in a plane parallel to the plane of the keyboard, and cooperate with stops actuated by the pre-set keyboard. As the adding mechanism commences its cycle, the racks move rearwardly a distance determined by the selected keys and in so moving, condition the tape printing mechanism of the adding mechanism to print the value determined by the selected keys. On the return of the racks 29 to normal position, they revolve their respective accumulator wheels in accordance with the value placed in the keyboard by the selected keys. On each totaling operation of the adding mechanism, each adding rack moves rearwardly a distance sufficient to clear its respective accumulator wheel, and in so doing, conditions the printing mechanism to print the total which had been stored in the accumulator mechanism.

Drive mechanism for the card sensing and punching mechanisms

Referring now to Figs. 1 and 2, the card sensing or reading and punching mechanisms are mounted between two side plates 30 and 31. The secondary drive shaft 28 is mounted between the plates 30 and 31, and is driven by a parallel motion mechanism comprising a double armed crank 32 mounted on the end of the drive shaft 27, a second double armed crank 33 mounted on the end of secondary drive shaft 28, a first link 34 connecting one end of the crank 32 with one end of the crank 33, and a second link 35 connecting the other end of the crank 32 with the other end of the crank 33. Two card punching mechanism actuating cams 36 and 37 are fixedly mounted on the shaft 28, one adjacent the outside of each of the side plates 30 and 31. Similarly, two sensing mechanism actuating cams 38 and 39 are fixedly mounted on the shaft 28 and spaced outwardly from the cams 36 and 37, respectively.

Sensing or reading mechanism

The sensing mechanism comprises a reciprocating carriage having two slide members 40 and 41 parallel to and spaced outwardly from the side plates 30 and 31, respectively. As best seen in Figs. 1 and 6, the slide 40 is provided with an elongated slot 42 which slidably embraces the shaft 28 and guides the rear end of said slide 40. Slide 41 is provided with a similar slot (not shown) for similar purposes. Two follower rollers 43 and 44 are rotatably mounted on the slide 40 and are in contact with the periphery of the cam 38 at diametrically opposed points. Similarly, two follower rollers 45 and 46 are mounted on the slide 41 and are in contact with the periphery of cam 39. The two cams 38 and 39 have exactly the same cam profile so the slides 40 and 41 move rearwardly and forwardly in unison.

A pair of L-shaped members 47 and 48 extend laterally of the machine and are fastened to the forward end of the slide 41 by a nut and bolt connection 49 and to the forward end of the slide 40 by a nut and bolt connection 50. As can best be seen in Figs. 3 through 5, the vertical portions of the members 47 and 48 are spaced slightly from each other and the upper ends thereof are bent outwardly away from each other, as indicated at 51 and 52, to form a card receiving slot 53 adapted to receive a record card or sheet 54. The slides 40 and 41, together with the card receiving members 47 and 48, form a rigid carriage which is adapted to reciprocate rearwardly and forwardly under the influence of cams 38 and 39 when the shaft 28 is actuated.

The vertical portion of member 48 is provided with a plurality of holes 55, and the vertical portion of the member 47 is provided with a plurality of matching holes 56, through which a plurality of sensing pins is adapted to project when the sensing carriage is reciprocated. Referring to Figs. 2 and 3, it is seen that there are twelve vertical rows of sensing pins and that there are four pins in each row. The first eleven rows represent one row for each denominational order of the machine and one for the carry-over column. The extreme right column, when viewed from the front of the machine, performs a special function which will be hereinafter described.

The four pins in each column are given the numerical designations of one, two, four and seven, numbering from the top to the bottom, whereby by using one, or a combination of two of the pins, any numerical designation from one to nine may be represented. While the one, two, four, seven system of coding is used in the preferred form of the invention, it should be realized that other coding systems might be used without departing from the spirit of the invention.

The mechanism associated with each vertical row of the sensing mechanism, and hence each denominational order of the adding mechanism, with the exception of the extreme righthand row, is exactly the same and hence only one will be described in detail.

Referring now to Fig. 3, four sensing pins 57, 58, 59 and 60 are mounted one above the other in reciprocable relation to a pair of perforated plates 61 and 62, which in turn are mounted between side plates 30 and 31. The sensing pins 57 through 60 are in line with and are adapted to extend through the holes 55 and 56 in the plates 48 and 47, respectively, when the sensing carriage is reciprocated. A pair of guide pins, only one of which is shown at 63, is fastened to the plate 47 and extends rearwardly therefrom. The pins 63 are slidably received in suitable holes provided in the guide member 61 and keep the holes 55 and 56 in proper alignment or register with the sensing pins 57 through 60.

Each of the sensing pins 57 through 60 is stepped, thus forming a shoulder, as indicated at 64a, which abuts the inner surface of the guide member 61 and limits the forward motion of the sensing pins. Each of the sensing pins has a light compression spring 65a encircling its rear portion. The forward end of each spring 65a is fastened to its respective pin and the rear portion of the spring abuts the guide member 62 thus urging each pin toward its forwardmost position.

Four rearwardly extending calibrating arms 64, 65, 66 and 67 are pivotally attached to the rear ends of the pins 57, 58, 59 and 60 respectively. Each of the calibrating arms has a calibrating toe at its rearmost end and all of the calibrating arms are disposed in the same vertical plane, the toe on the arm 64 being one unit high, the toe on the arm 65 being two units high, the toe on the arm 66 being four units high, and the toe on the arm 67 being seven units high.

The calibrating arms 64 to 67 are provided with vertically extending abutment surfaces 68 to 71, respectively, which are operatively associated with four restoring bars 72 to 75, respectively. As can best be seen in Fig. 1, the restoring bars 72 to 75 extend through vertical slots 76 and 77 formed in the slide 40 and through similar slots (not shown) in the slide 41. The bars also extend through cam slots 78 to 81 formed in each of the side plates 30 and 31. From this description, it can be seen that when the sensing carriage mechanism moves rearwardly, the restoring bars move rearwardly therewith. The three lower bars 73 to 75 also simultaneously move upwardly to permit upward pivotal movement of their associated calibrating arms 65, 66 and 67. When the sensing carriage moves forwardly, the restoring bars cooperate with the abutments 68 to 71 to restore the calibrating arms to their rest position illustrated in Fig. 3. Stop pins 82, 83 and 84 slidably engage the underside of the calibrating arms 65, 66 and 67, respectively, to prevent downward pivotal movement thereof beyond their normal rest position.

The mechanism for correlating the calibrating toes of the sensing mechanism to the adding and printing mechanisms of the adding mechanism comprises a vertically movable slide member 85 which is guided for rectilinear vertical movement by two combs 86 and 87 mounted between the side plates 30 and 31. Two channel-shaped back-up members 88 and 89 prevent rearward movement of the slide 85 and a lug 90 extends from the forward face of the slide and rides against the vertical rear edge of a plate 91 to prevent forward movement of said slide. A horizontal slot 92 is formed adjacent the upper end of the slide 85, and a pin 93 fastened to one arm 94 of a bell crank 95 rides in said slot. The other arm 96 of the bell crank 95 has a pin 97 which rides in a slot 98 formed in the lower end of the adding rack 29 of the adding machine. The bell crank is pivotally mounted on a shaft 99 fastened between the side plates 30 and 31. A comb 100, similarly mounted, maintains the several bell cranks in proper spaced relationship. A stop abutment 101 extends forwardly from the slide 85. The stop abutment is stepped laterally so as to lie adjacent the plate 91 in the same vertical plane as the calibrating arms 64 to 67.

Sensing operation

In a sensing operation, it will be appreciated that the zero stops on the keyboard of the adding machine must be deactivated so as not to control the movement of the racks 29. This may be accomplished either by the provision of a zero deactivating mechanism key in a manner well known in the art, or it may be accomplished by pressing the nine keys in each column of the adding mechanism and activating the repeat button of the adding mechanism in order to keep the nine keys depressed, thus leaving the control of the movement of the racks 29 dependent on the sensing mechanism described above.

In performing a sensing or tabulating operation, a precoded (by punching) card 54 is inserted in the slot 53 of the sensing mechanism. For purposes of illustration, we will consider that the card has been coded for the numeral five in the particular column illustrated in Figs. 3 and 4. At the start of the cycle of the machine, the sensing carriage is moved rearwardly and, as can be seen in Fig. 4, the pins 57 and 59 extend through the holes formed in the card 54, thus allowing the calibrating arms 64 and 66 representing the numerical designations one and four to remain in their forwardmost position. Sensing pins 58 and 60 are moved rearwardly by the card and thus move the calibrating arms 65 and 67 rearwardly into line with the stop abutment 101 formed on the vertical slide 85. The rack 29 is then moved by the adding mechanism diagonally upward and to the right until the abutment 101 contacts the lowest surface of the calibrating arm 67. The arm 67 is pivoted upwardly until the upward end of the seven unit toe on the rear end thereof contacts the lower surface of the two unit toe on the arm 65. The two arms are then pivoted upwardly together until the upper surface of the calibrating toe on the arm 65 abuts the channel-shaped stop member 139. At this point, the rack of the adding machine is in the proper condition to print the numeral five on the recording tape of the machine and also to operate its associated accumulator wheel five digits. On the return of the sensing carriage, the restoring bars 72 through 75 return the calibrating arms 64 through 67, respectively, to the rest position, as indicated in Fig. 3, and the device is ready for the next card to be tabulated.

Punching mechanism

The punching mechanism comprises a carriage similar in construction to that of the carriage of the sensing mechanism. A slide 102 is located parallel to and between the sensing carriage slide 40 and side plate 30. A second slide 103 is located parallel to and between the sensing carriage slide 41 and side plate 31. Two follower rollers 104 and 105 are mounted on the slide 102 and contact the cam surface of the cam 36 at diametrically opposed points. Similarly, two follower rollers 106 and 107 are mounted on the slide 103 and contact the cam surface of the cam 37 at diametrically opposed points.

As best seen in Fig. 7, the slide 102 has a slot 108 formed therein which embraces the shaft 28 to guide the rear end of the slide, and the slide 103 is provided with a similar slot (not shown) for similar purposes. A spacer block 109 is connected between the lower portions of the forward ends of the slides 102 and 103. Block 109 is trapezoidal in cross-section and is mounted with the tapered surface 110 uppermost.

A die plate 111 is mounted to the rear surface of the block 109 and extends upwardly therefrom. A plurality of holes 112 is provided in said die plate to cooperate with a plurality of cylindrical punches generally indicated by 123. A stripper plate 113 is mounted adjacent the rear surface of the die plate 111 and is separated therefrom by a suitable spacing member 114 to provide a card receiving slot 115 between said plates 111 and 113. The stripper plate 113 is provided with a plurality of holes 116 in exact alignment with the holes 112 in the die plate 111. A guide plate 118 is fastened to and spaced rearwardly from said stripper plate 113 and is provided with a plurality of holes 119. The punches 123 are slidably mounted in close fitting relation in the holes 116 and 119 in the plates 113 and 118, respectively, such holes being in accurate alignment with the holes 112 in the die plate 111. A plate 120 is mounted between the side plates 30 and 31 and is provided with a plurality of oversize holes 121 through which the rear ends of the punches 123 extend. Each of the punches 123 is provided with an enlarged head 124 which abuts the rear surface of the plate 120 to limit forward movement of the punches. A pair of dowel pins, one of which is shown at 122, has a tight fit with the elements 118, 113, 114, 111 and 109 and extends rearwardly from plate 118 in slidable relation with suitable openings provided in the plate 120 to keep said elements in exact alignment when the punching mechanism is reciprocated.

As described above with respect to the sensing fingers, there are twelve rows of punches 123 and four punches in each row. Since the mechanism for each row of punches is exactly the same, with the exception of the extreme righthand row, only the punching mechanism for one row will be described in detail.

Four punches 123 are slidably mounted one above the other in the same vertical plane in the holes 119 and 121 provided in the guide plates 118 and 120, respectively.

Referring now to Fig. 5, four punch actuating members 125 to 128, respectively, are mounted with their forwardly protruding punch actuating projections extending through suitable openings provided in a guide plate 129 mounted between side plates 30 and 31. The actuators 125 and 126 are mounted adjacent to and in sliding relation with each other, and are adapted to actuate the topmost and next lower punches respectively. Similarly, the punch actuators 127 and 128 are mounted adjacent each other and below the actuators 125 and 126. Actuators 127 and 128 are adapted to actuate the next to lowest and lowest punches repectively. The rearward ends of the punch actuators are guided for rectilinear movement by being confined between suitable guides comprising channel member 130 fastened between the side plates 30 and 31, and rods 131 and 132 fastened between vertical plates 133 which separate the punch actuators of one column from the punch actuators of the next. A restoring bar 134 comprising two L-shaped members fastened back to back extends through suitable slots (not shown) formed in the side plates 30 and 31 and is fastened to the slides 102 and 103 of the punching mechanism carriage. The vertically extending flanges of the restoring bar 134 cooperate with rearwardly facing abutting surfaces 135 provided on the punch actuating members 125 to 128, respectively, to restore said members to their rest position shown in Fig. 3 after each cycle of the machine.

Each of the punch actuating members 125 to 128 is provided with rearwardly extending lugs 136 which cooperate with forwardly extending lugs 137 and 138 formed integrally with slide 85 previously described. The upper lug 137 is adapted to actuate the punch actuators 125 and 126 and the lower lug 138 is adapted to actuate the lower punch actuators 127 and 128.

Punching operation

The operation of the punching mechanism of the device is best understood by referring to Figs. 3 and 5. A card 54 to be punched is inserted in the groove 115 in the manner shown in Figs. 3 and 5 and the proper designation is set into the keyboard of the adding machine. For purposes of illustration, we will consider that the column under question in Figs. 3 and 5 has been actuated on the adding mechanism to indicate the numeral five. When the actuating bar of the adding mechanism is actuated, the rack 29 moves diagonally upward and to the rear until it is stopped by the stop mechanism associated with the five key in that column wherein it will be located in the position illustrated in Fig. 5. The movement of the rack 29 actuates the bell crank 95 and thereby raises the slide 85 to the position indicated in Fig. 5. It will be noted that since there is no card in the slot 53 of the sensing mechanism, the sensing pins remain in the forward position and do not interfere with the operation of the slide 85. The raising of the slide 85 brings the lug 138 thereon adjacent the rearwardly extending lug 136 on the punch actuator for the punch indicating the numeral four. Similarly, the lug 137 is brought into line with one of the rearwardly extending lugs 136 on the punch actuator for the punch indicating the numeral one. Rearward movement of the punching carriage mechanism carries the die-plate 111 rearwardly, and since there is no resistance to the rearward movement of the punches for indicating two and seven, these two punches are merely moved rearwardly by the card 54 present in the slot 115. The punches indicating the numerals one and four are held forward by means of the punch actuators 125 and 127 which in turn are held forward by the lugs 137 and 138, respectively, and hence the punches for the designations one and four are forced to penetrate said card to form holes therein representing the numerical value five for the particular column described. After the punching operation has been completed, the carriage returns to its forwardmost position and the restoring bar 134 moves the punch actuators and thereby the punches to their forward or rest position as indicated in Fig. 3.

The righthand column of the sensing or reading mechanism and card punching mechanism is reserved for certain keying information designed to control, or be actuated in response to, certain specific operations of the adding mechanism. For example, a sensing pin may be provided which is operatively connected to the subtract key of the adding mechanism to cause the punch coded designation on a certain record card or sheet to be subtracted during a tabulating operation. Similarly, a sensing pin may be provided which is operatively connected to the non-add key of the adding mechanism. Obviously, if a sensing pin is provided to control a certain operation of the adding mechanism, a corresponding punch must be provided in the punching mechanism and said punch must be operatively associated with the corresponding key on the adding mechanism to be actuated thereby to punch code a record card or sheet with the proper control designation at the same time that the numerical value is encoded thereon.

If it is desired to tabulate a series of cards, each of which has previously been punched with coded designations, the cards are inserted one at a time into the card receiving slot 53 in the sensing mechanism and the machine actuated through one cycle of operation by depressing the appropriate actuating bar (add or subtract) of the adding mechanism. On each cycle of operation, the sensing mechanism reads the coded designation on the card in the slot 53 and translates said coded designation into a numerical value on the accumulating and printing mechanism of the adding machine. The printing mechanism of the adding mechanism prints the numerical value of the card on a tape, and the accumulator adds said numerical value to the amount previously stored therein. After the series of cards has been run through the machine, an uncoded card may be inserted into the slot 115 of the punching mechanism and the total bar of the adding mechanism depressed, whereupon the machine will both print the accumulated total on said tape and punch the coded designation thereof on said uncoded card.

If it is desired to punch code a series of cards, the uncoded cards are inserted one at a time into the slot 115 of the punching mechanism. As each card is inserted into the slot 115, the numerical value to be punch coded thereon is set into the adding mechanism by depressing the appropriate keys thereof, and the appropriate actuating bar (add or subtract) is depressed to actuate the machine. When the machine is so actuated, the punching mechanism of the machine translates the numerical value preset on the keyboard of the adding mechanism to the proper coded designation and then punches the same into the uncoded card. Simultaneously, the printing mechanism prints on a tape the numerical value, and the accumulating mechanism adds the amount to that previously stored therein. After the entire series of cards has been punch coded, an additional uncoded card is inserted in slot 115 and the total key of the adding mechanism depressed, whereupon the machine will both print the accumulated total on said tape and punch the coded designation thereof into said additional card.

It is obvious that when tabulating a series of previously coded cards in the manner set forth above, an uncoded card may be inserted in the slot 115 of the punching mechanism each time one of the previously coded cards is inserted in the slot 53 of the sensing mechanism. In this manner, a duplicate set of punch coded cards may be produced at the same time that the tabulating procedure described above is performed.

While I have shown the preferred form of my invention, it is to be understood that changes may be made in its construction by those skilled in the art without departing from the spirit of the invention as defined in the appended claims.

Having thus described my invention, what I claim and desire to secure by Letters Patent is:

1. In combination, an adding mechanism having a frame and reciprocating racks mounted thereon for controlling the accumulator wheels and printing mechanism thereof, a punched card-sensing mechanism comprising a reciprocating carriage, a card slot in said carriage adapted to receive a punch coded record card, a plurality of sensing pins mounted in the path of movement of said card for sensing the punch coded designation of said record card when said carriage is reciprocated, a plurality of calibrating arms each pivotally connected at one of its ends with one of said sensing pins to pivot in a vertical plane, a plurality of calibrating toes one at the other end of each of said arms whereby said calibrating toes will be selectively moved to an actuated position by said sensing pins when said pins are moved by said card, said calibrating toes when in their actuated position being in a common vertical plane, said actuated calibrating toes being free to move upwardly against an adjacent actuated toe, a fixed stop member on said frame to limit upward movement of the uppermost actuated toe, a vertical slide bar connected to the adding and printing control racks of said adding mechanism for actuation thereby, and a stop abutment on said vertical slide bar adapted to contact the lowermost of said toes which have been actuated by said sensing pins and thereby control the movement of said vertical slide bar and the rack of the adding mechanism in accordance with the action of said sensing pins.

2. In combination, an adding mechanism having a frame and reciprocating racks mounted thereon for controlling the accumulator wheels and printing mechanism thereof, a punched card-sensing mechanism comprising a reciprocating carriage, a card slot in said carriage adapted to receive a punch coded record card, a plurality of sensing pins mounted in the path of movement of said card for sensing the punch coded designation of said record card when said carriage is reciprocated, a plurality of calibrating arms each pivotally connected at one of its ends with one of said sensing pins to pivot in a vertical plane, a plurality of calibrating toes one at the other end of each of said arms whereby said calibrating toes will be selectively moved to an actuated position by said sensing pins when said pins are moved by said card, said calibrating toes when in their actuated position being in a common vertical plane and being each of a different height from one another, said actuated calibrating toes being free to move upwardly against an adjacent actuated toe, a fixed stop member on said frame to limit upward movement of the uppermost actuated toe, a vertical slide bar connected to the adding and printing control racks of said adding mechanism for actuation thereby, and a stop abutment on said vertical slide bar adapted to contact the lowermost of said toes which have been actuated by said sensing pins and thereby control the movement of said vertical slide bar and the rack of the adding mechanism in accordance with the action of said sensing pins.

3. In combination, an adding mechanism, a card sensing mechanism comprising a first reciprocating carriage, a card slot in said first carriage adapted to receive a punch coded record card, a plurality of sensing pins mounted in the path of movement of said card for sensing the coded designation on said punch coded record card when said first carriage is reciprocated, a plurality of calibrating means operatively connected with said sensing pins to be selectively actuated thereby when said pins are moved by said card, means connected to said adding mechanism for actuation thereby, said last-mentioned means being adapted to contact the calibrating means which have been actuated by said sensing pins and thereby control the movement of said racks and said adding mechanism in accordance with the action of said sensing pins, a second reciprocating carriage, a card slot in said second carriage adapted to receive an uncoded record card, a plurality of punches in the path of movement of said card and selectively operable to punch a coded designation on said uncoded record card when said second carriage is reciprocated, and means on said last-mentioned means adapted to activate said punches in accordance with the amount of movement of said last-mentioned means to selectively prevent said punches from moving with said card and thereby causing said punches to punch said uncoded record card with the same coded designation as that on said punch coded card controlling the action of said sensing pins.

4. In combination, an adding mechanism having reciprocating racks for controlling the accumulator wheels and printing mechanism thereof, a card sensing mechanism comprising a first reciprocating carriage, a card slot in said first carriage adapted to receive a punch coded record card, a plurality of sensing pins mounted in the path of movement of said card for sensing the coded designation on said punch coded record card when said first carriage is reciprocated, a plurality of calibrating means operatively connected with said sensing pins to be selectively actuated thereby when said pins are moved by said card, means connected to the adding and printing racks of said adding mechanism for actuation thereby, said last-mentioned means being adapted to contact the calibrating means which have been actuated by said sensing pins and thereby control the movement of said racks and said adding mechanism in accordance with the action of said sensing pins, a second reciprocating carriage, a card slot in said second carriage adapted to receive an uncoded record card, a plurality of punches in the path of movement of said card and selectively operable to punch a coded designation on said uncoded record card when said second carriage is reciprocated, and means on said last-mentioned means adapted to activate said punches in accordance with the amount of movement of said last-mentioned means to selectively prevent said punches from moving with said card and thereby causing said punches to punch said uncoded card with the same coded designation as that on said punch coded card controlling the action of said sensing pins.

5. In combination, an adding mechanism having reciprocating racks for controlling the accumulator wheels and printing mechanism thereof, a card sensing mechanism comprising a first reciprocating carriage, a card slot in said first carriage adapted to receive a punch coded record card, a plurality of sensing pins mounted in the path of movement of said card for sensing the coded designation on said punch coded record card when said first carriage is reciprocated, a plurality of calibrating means operatively connected with said sensing pins to be selectively actuated thereby when said pins are moved by said card, a plurality of vertically slidable members one connected to each of the adding and printing racks of said adding mechanism for actuation thereby, said vertically slidable members being adapted to contact the calibrating means which have been actuated by said sensing pins and thereby control the movement of said racks and said adding mechanism in accordance with the action of said sensing pins, a second reciprocating carriage, a card slot in said second carriage adapted to receive an uncoded record card, a plurality of punches in the path of movement of said card and selectively operable to punch a coded designation on said uncoded record card when said second carriage is reciprocated, and means on said vertically slidable members adapted to activate said punches in accordance with the amount of movement of said vertically slidable members to selectively prevent said punches from moving with said card and thereby causing said punches to punch said uncoded card with the same coded designation as that on said punch coded card controlling the action of said sensing pins.

6. In combination, an adding mechanism having reciprocating racks for controlling the accumulator wheels and printing mechanism thereof, a card sensing mechanism comprising a first reciprocating carriage, a card slot in said first carriage adapted to receive a punch coded record card, a plurality of sensing pins mounted in the path of movement of said card for sensing the coded designation on said punch coded record card when said first carriage is reciprocated, a plurality of calibrating means operatively connected with said sensing pins to be selectively actuated thereby when said pins are moved by said card, a vertically slidable bar connected to each of the adding and printing racks of said adding mechanism for actuation thereby, a stop abutment on each of said vertically slidable bars adapted to contact the calibrating means which have been actuated by said sensing pins and thereby control the movement of said bars and the racks of said adding mechanism in accordance with the action of said sensing pins, a second reciprocating carriage, a card slot in said second carriage adapted to receive an uncoded record card, a plurality of punches in the path of movement of said card and selectively operable to punch a coded designation on said uncoded record card when said second carriage is reciprocated, and means on said vertically slidable bar adapted to activate said punches in accordance with the amount of movement of said vertically slidable bar to selectively prevent said punches from moving with said card and thereby causing said punches to punch said uncoded card with the same coded designation as that on said punch coded card controlling the action of said sensing pins.

7. In combination, an adding mechanism having reciprocating racks for controlling the accumulator wheels and printing mechanism thereof, a card sensing mechanism comprising a first reciprocating carriage, a card slot in said first carriage adapted to receive a punch coded record card, a plurality of sensing pins mounted in the path of movement of said card for sensing the coded designation on said punch coded record card when said first carriage is reciprocated, a plurality of calibrating means pivotally connected with said sensing pins to pivot in a vertical plane, said calibrating means being selectively movable to an actuated position by said sensing pins when said pins are moved by said card, a vertically slidable bar connected to each of the adding and printing racks of said adding mechanism for actuation thereby, a stop abutment on each of said vertically slidable bars adapted to contact the associated calibrating means which have been actuated by said sensing pins and thereby control the movement of said bars and the racks of said adding mechanism in accordance with the action of said sensing pins, a second reciprocating carriage, a card slot in said second carriage adapted to receive an uncoded record card, a plurality of punches in the path of movement of said card and selectively operable to punch a coded designation on said uncoded record card when said second carriage is reciprocated, and means on said vertically slidable bars adapted to activate said punches in accordance with the amount of movement of said vertically slidable bars to selectively prevent said punches from moving with said card and thereby causing said punches to punch said uncoded card with the same coded designation as that on said punch coded card controlling the action of said sensing pins.

8. In combination, an adding mechanism having reciprocating racks for controlling the accumulator wheels and printing mechanism thereof, a card sensing mechanism comprising a first reciprocating carriage, a card slot in said first carriage adapted to receive a punch coded record card, a plurality of sensing pins mounted in the path of movement of said card for sensing the coded designation on said punch coded record card when said first carriage is reciprocated, a plurality of calibrating arms each pivotally connected at one of its ends with one of said sensing pins to pivot in a vertical plane, a plurality of calibrating toes one at the other end of each of said arms whereby said calibrating toes will be selectively moved to an actuated position by said sensing pins when said pins are moved by said card, a vertical slide bar connected to each of the adding and printing racks of said adding mechanism for actuation thereby, a stop abutment on each of said vertical slide bars adapted to contact its associated calibrating toes and thereby control the movement of said bars and the racks of said adding mechanism in accordance with the action of said sensing pins, a second reciprocating carriage, a card slot in said second carriage adapted to receive an uncoded record card, a plurality of punches to punch a coded designation on said uncoded record card when said second carriage is reciprocated, and means on said vertical slide bars adapted to activate said punches in accordance with the amount of movement of said vertical slide bars to selectively prevent said punches from moving with said card and thereby causing said punches to punch said uncoded card with the same coded designation as that on said punch coded card controlling the action of said sensing pins.

References Cited in the file of this patent

UNITED STATES PATENTS

| | | |
|---|---|---|
| 1,780,621 | Lasker | Nov. 4, 1930 |
| 1,834,561 | Watson | Dec. 1, 1931 |
| 1,946,913 | Maul | Feb. 13, 1934 |
| 2,050,745 | Woodruff et al. | Aug. 11, 1936 |
| 2,146,283 | Bryce | Feb. 7, 1939 |
| 2,185,259 | Lasker | Jan. 2, 1940 |
| 2,512,865 | Lopez | June 27, 1950 |